United States Patent [19]

Brännstroöm

[11] Patent Number: 4,767,243
[45] Date of Patent: * Aug. 30, 1988

[54] PNEUMATIC CONVEYING SYSTEM WITH DIRECTIONAL CHANGE OF A GAS/PARTICULATE MATERIAL STREAM

[75] Inventor: Roine Brännstroöm, Finspong, Sweden

[73] Assignee: Asea Stal AB, Finspong, Sweden

[ * ] Notice: The portion of the term of this patent subsequent to Oct. 13, 2004 has been disclaimed.

[21] Appl. No.: 832,954

[22] Filed: Feb. 26, 1986

[30] Foreign Application Priority Data

Feb. 26, 1985 [SE] Sweden ................................. 8500923

[51] Int. Cl.⁴ ............................................. B65G 53/04
[52] U.S. Cl. ...................................... 406/193; 406/195
[58] Field of Search ......................... 406/195, 191, 193

[56] References Cited

U.S. PATENT DOCUMENTS 610,066  8/1898  Kuser ................................. 406/193
3,313,035  4/1967  Crawford et al. .................. 34/57 R
4,436,459  3/1984  Caldwell ............................ 406/195

FOREIGN PATENT DOCUMENTS 687239  5/1964  Canada ............................... 406/193
3247741  6/1984  Fed. Rep. of Germany ...... 406/195
839942  6/1981  U.S.S.R. ............................. 406/193

Primary Examiner—Albert W. Davis, Jr.
Attorney, Agent, or Firm—Pollock, Vande Sande & Priddy

[57] ABSTRACT

A pneumatic conveying system for conveying particulate material includes a connection chamber for changing the direction of flow so as to bring about a pressure drop. An upstream tube and a downstream tube are connected, spaced from each other, to an end wall in the connection chamber. Between the tubes, the end wall is formed with a double-curved surface bulging inwards towards the connection chamber, said surface being suitably saddle-shaped.

8 Claims, 4 Drawing Sheets

PNEUMATIC CONVEYING SYSTEM WITH DIRECTIONAL CHANGE OF A GAS/PARTICULATE MATERIAL STREAM

TECHNICAL FIELD

The present invention relates to a pneumatic conveying system in which a conveying pipe includes units in which the direction of flow of a gas/particulate material stream is changed one or more times.

PRIOR ART

When transferring a particulate material from a container which is under a first pressure to a container which is under a lower pressure, for example atomospheric pressure, it is known to bring about the necessary reduction in pressure by repeated diversion of the gas/-particulate material flow by successively changing the direction of flow of the material at tube bends or in connection chambers through an angle of 90° or 180°. Such a conveying system is disclosed in the specification of my copending U.S. CIP Application Ser. No. 563,427 filed on Dec. 20, 1983. In this specification the conveying system is utilized, inter alia, in a power plant with combustion in a pressurized fluidized bed (i.e. a PFBC plant). The combustion chamber (with its fluidized bed) and cyclone cleaners for the combustion gases are enclosed within a pressure vessel, in which a pressure of up to about 2 MPa (20 bar) may prevail.

In a transportation plant with a flow divider, in which a main flow is divided into a number sub-flows, it is also known to use means for diverting a gas/particulate material flow at tube bends or in connection chambers for achieving a pressure drop which brings about a condition such that the flow of paticulate material is split into a number of separate flows in a number of conveying pipes emanating from a distribution chamber where, in these split flows, there is a constant relation of the particulate flow between the different pipes. Such a conveying system for feeding coal via a number of nozzles into a combustion chamber with a fluidized bed is disclosed in Swedish patent application No. 8500750-8 and its corresponding U.S. patent application Ser. No. 826,045 filed on Feb. 4, 1986 in the names of Brännström and Månsson.

Particulate material is often highly abrasive. In an ash discharge system, the particulate material also has a high temperature, which further increases the stresses on the material from which the conduits of the conveying system are made. Granular crushed coal is often highly abrasive. The shape of the above-mentioned tube bends or connection chambers is therefore of extreme importance if abrasion by the conveyed materials is to be kept to tolerable levels. Erosion in downstream tubes in a portion immediately following a connection chamber in which a flow diversion has occurred has posed particularly great problems.

SUMMARY OF THE INVENTION

According to the invention, a connection chamber in which a diversion of gas flow of the order of magnitude of 180° can occur is made with two end walls and with side walls connecting these end walls together, an upstream tube and a downstream tube being connected at some distance from each other to one end wall. The connection chamber is given such a length that an erosion-reducing cushion of material is formed adjacent an opposed end wall, which cushion prevents particulate material entering the chamber from contacting the end wall and eroding the same. The end wall, to which the said tubes are connected, is formed on its inner side with an inwardly-extending double-curved surface which smoothly connects with the inner surface of the tubes and suitably has a tangent at that point which is parallel to the inner surfaces of the tubes. The surface is suitably saddle-shaped and is rotary-symmetrical in the median plane passing through the axes of the tubes and in planes which are parallel to this median plane. With this embodiment, the radius of curvature is in each plane equal to half the distance between the inner surfaces of the tubes in that plane.

In the connection chamber the flow of gas/particulate material is diverted, as mentioned, in the order of magnitude of 180°. For obtaining good operation, the tubes should be parallel or almost parallel. However, there may be an angle between the tubes of up to 30°, without upsetting the satisfactory functioning and service life of the connection chamber.

The side walls of the connection chamber may consist of half an upstream tube and half a downstream tube and flat plates inserted between the walls of these tubes.

BRIEF DESCRIPTION OF THE DRAWINGS

The invention will now be described in greater detail, by way of example, with reference to the accompanying drawings, wherein.

DESCRIPTION OF PREFERRED EMBODIMENTS

Figure 1:
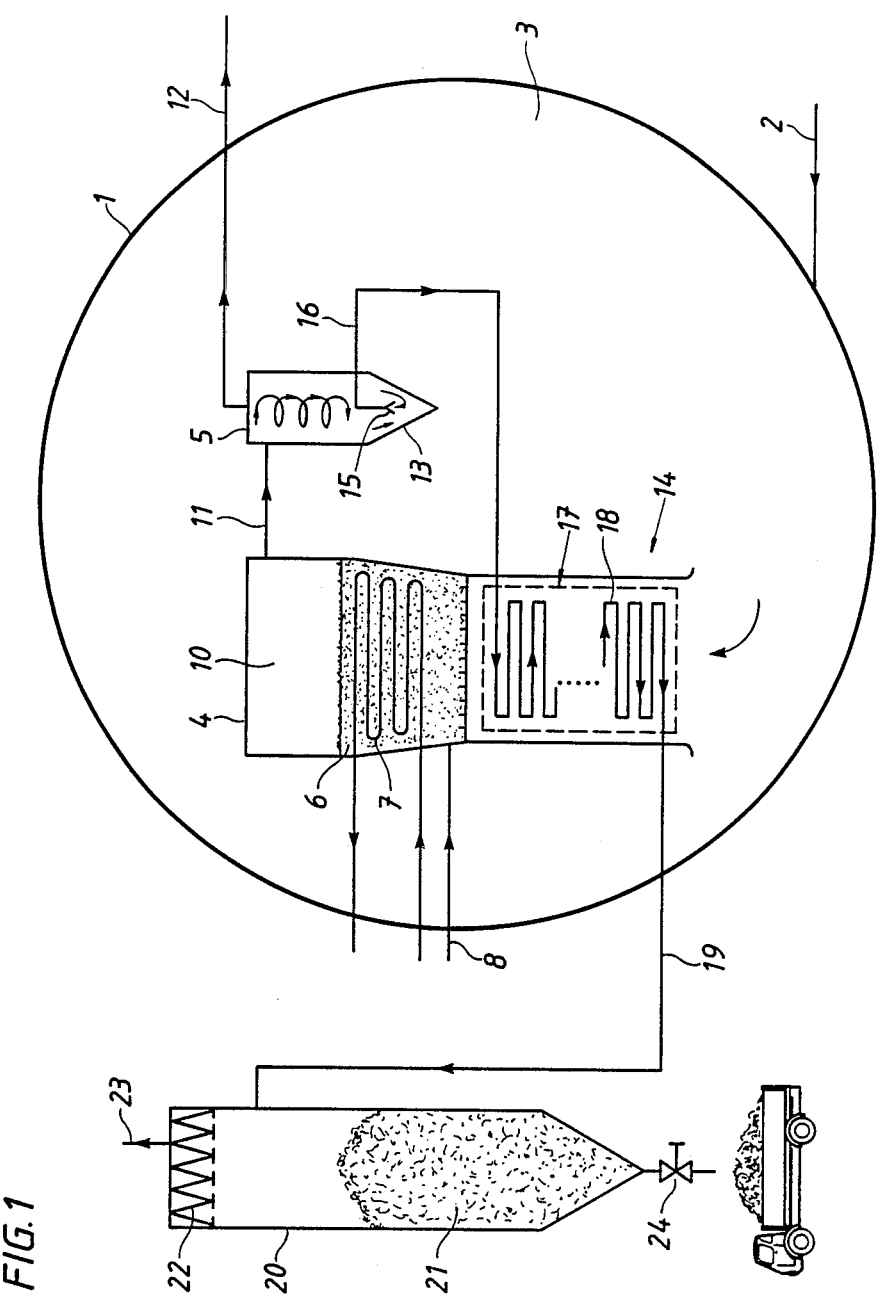
FIG. 1 shows a PFBC power plant in which a pneumatic conveying system in accordance with the invention is included in the arrangement for ash discharge.

In the PFBC power plant shown in FIG. 1, 1 designates a pressure vessel enclosing a space 3. Through a conduit 2, the space 3 is fed with combustion air from a compressor (not shown). The pressure vessel 1 encloses a combustion chamber 4 and a cyclone dust separator 5. In reality a plurality of parallel groups of series-connected cyclones would almost certainly be used, but just one unit 5 has been shown for convenience.

In the lower part of the combustion chamber 4 there is located a fluidized bed 6 of a particulate material and a tube bundle 7 for cooling of the bed 6 and for operation of steam for a steam turbine (not shown). Particulate fuel is supplied to the bed 6 through a conduit 8 from a fuel storage hopper (not shown). The plenum space 10 above the bed 6 is connected to the cyclone by means of a conduit 11. In the cyclone 5 ahses from the combustion chamber 4 are separated from the combustion gases before the gases are passed to a gas turbine (not shown) through a conduit 12. The ashes are collected in the conical bottom part 13 of the cyclone 5 and are removed through a pressure-reducing stage 14. A discharge nozzle 15 is provided in the cyclone 5 and ashes and transport gas are drawn into the nozzle 15 and flow, via a conduit 16, to the pressure-reducing stage 14. The pressure-reducing stage 14 is constituted by a conduit 17, in which successive reductions in pressure are obtained by repeatedly diverting the gas/ash flow in a series of overflow connection chambers 18 before it is transported through a conduit 19 to a collecting container 20. Ashes 21 are separated from the gas and collect in the lower part of the container 20. The transport gas is cleaned in a filter 22 and removed through a conduit 23. The ashes 21 are removed from the container 20 via a sluice valve 24.

Figure 2:
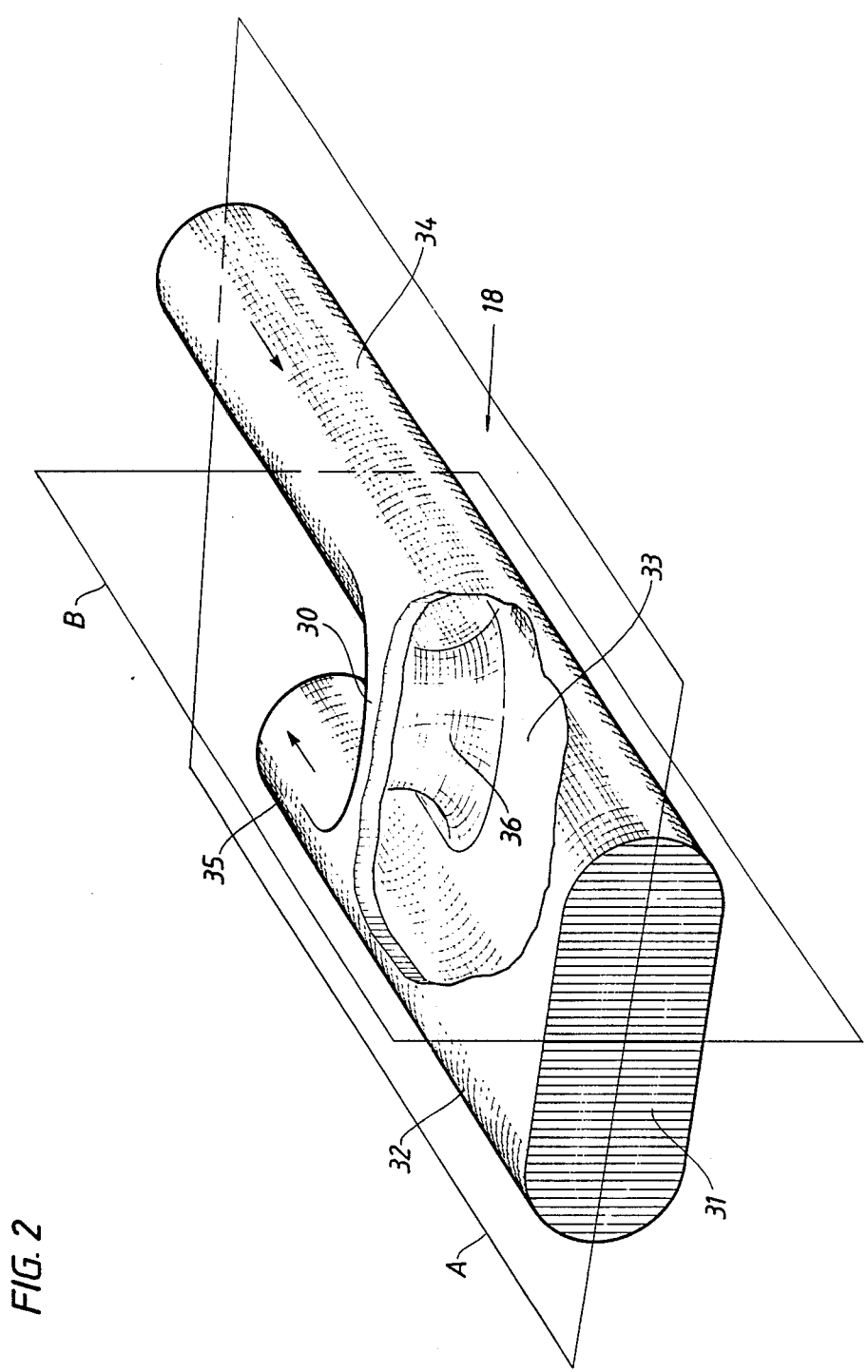
FIG. 2 is a partially broken-away perspective view of a connection chamber used in the power plant of FIG. 1.
Figure 3:
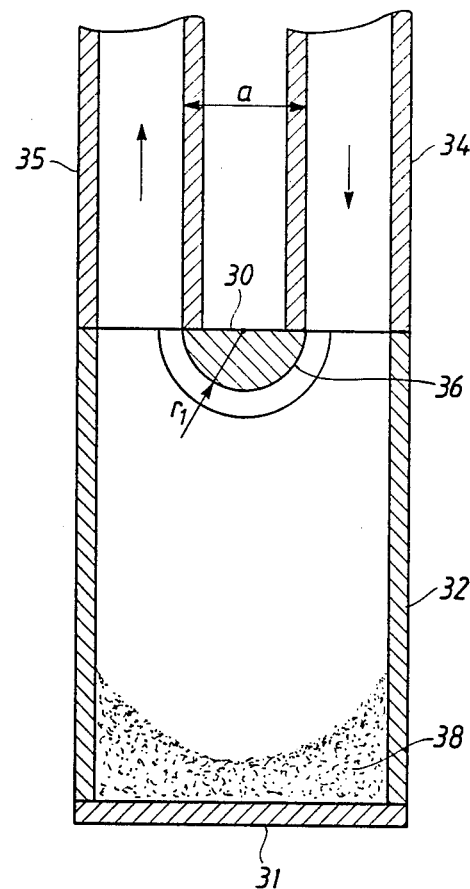
FIG. 3 shows a section in the plane A through the connection chamber of FIG. 2 and the tubes connected to this chamber.

FIG. 2 is a perspective sketch of one of the overflow connection chambers 18. This consists of a first end wall 30, a second end wall 31 and a side wall 32 surrounding a chamber space 33 of the connection chamber. The space 33 has such an axial extension that a cushion 38 of material is formed against the end wall 31, which cushion 38 prevents particulate material entering the space 33 from an upstream tube 34 from contacting the end wall 31 and causing erosion damage. The upstream tube 34 and a downstream tube 35 are connected to the end wall 30 at a distance a from each other. The optimum value for the distance a can be determined by means of tests and typicallky will be greater than one and smaller than two internal tube diameters. On the side facing towards the space 33, the end wall 30 is saddle-shaped and may be formed from a saddle-shaped plate or half a rotary-symmetrical body which is divided in its symmetry plane. The radius of curvature of the surface 36 (in the plane A of FIG. 2) is, as shown at $r_1$ in FIG. 3, equal to half a (i.e. half the distance between the inner surfaces of the tubes 34, 35 in the plane A). The radius of curvature of the surface 36 is also equal to half the distance between the inner surfaces of the tubes 34, 35 in all other planes parallel to the plane A. An embodiment of this kind is very favorable from the point of view of ease of manufacture. Other curve shapes may, of course, also occur in these planes; for example, the curve may be parabolas or half ellipses. The important point is that for any given shape of the surface 36 the flow at the outlet of the connection chamber should be such that the particles do not strike the wall of either of the tubes in such a way as to cause any significant erosion.

Figure 4:
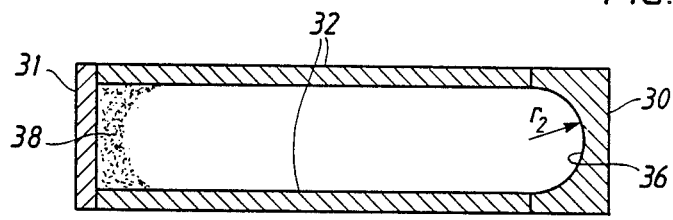
FIG. 4 shows a section in the plane B through the connection chamber of FIG. 2.

FIG. 4 shows a section through the chamber 18 of FIG. 2 in a plane B mid-way between the tubes 34, 35 and parallel thereto. The radius of curvature $r_2$ of the surface 36 in plane B is the same as the inner radius of the tubes 34, 35. The saddle-shaped end wall 30 may have a varying radius of curvature in the plane A. From the point of view of good flow conditions, it is convenient for the tangent of the surface to be parallel to the inner surfaces of the tubes 34, 35 at the point of connection.

Figure 5:
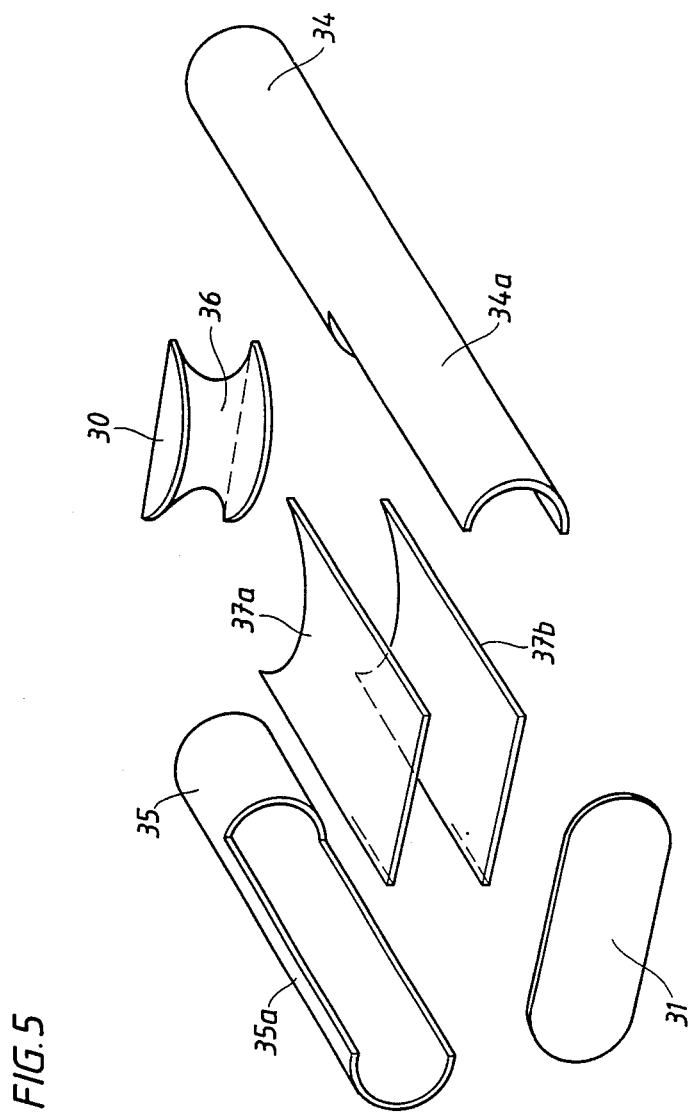
FIG. 5 is a perspective view showing how a connection chamber such as that shown in FIG. 2 may be composed from tube parts, side walls and end walls.

FIG. 5 shows the component parts of an overflow connection chamber of the kind shown in FIG. 2 and indicates one convenient method of putting those parts together. Half of the walls of the rubes 34, 35 are removed over end regions thereof. The remaining parts 34a, 35a are connected together with a pair of parallel plates 37a, 37b. The parts 34a, 35a, 37a and 37b then form the side wall 32. The end walls 30 and 31 may be connected to the tubes 34, 35 and the sheets 37a, 37b and to the parts 34a, 35a, 37a, 37b, respectively. In FIG. 5 the end wall 30 is shown as half of a rotary-symmetrical body divided along its symmetry plane.

The axis of the tubes 34, 35 are parallel in FIG. 2, but they can converge (preferably at an angle less than 30°). Suitably the distance between the end walls 30, 31 is between three and six times greater than the internal diameter of the tubes 34, 35 (or the internal diameter of the smaller of the two tubes if these are different).

Since various modifications are clearly possible to the details of the design shown in the drawings it should be appreciated that the invention is defined by the following claims and is not limited to the embodiments specifically described.

I claim:

1. Apparatus for providing at least part of a discharge system for conveying a mixture of gas and particulate material from a pressurized container to a collecting container or other place which is under lower pressure than the pressurized container, said apparatus comprising:

conduit means having a plurality of substantially parallel tube portions connected in series one after the other and including a first tube portion, a last tube portion downstream of said first tube portion, and a plurality of intermediate tube portions between said first tube portion and said last tube portion;

elongated overflow means connecting each upstream tube portion to a successive downstream tube portion, said upstream and successive downstream tube portions opening into said overflow means; and means for discharging a continuous flow of said gas and particulate mixture from said pressurized container into said first tube portion;

said overflow means connecting each tube portion to the next successive tube portion being shaped to stop the particles or substantially reduce the speed of the particles, whereafter they are accelerated again such that substantial reductions in pressure are obtained at each of said overflow means;

said overflow means providing a blind space for accumulating an erosion preventing cushion taking up the impact of said particulate material at said overflow means;

and the number of said tube portions and overflow means and the cross-sectional area of each being such that a desired flow of said gas and particulate material is achieved and the pressure of said flow is reduced from the pressure of said pressurized container to said lower pressure;

wherein the transition between an upstream and a downstream tube portion of the overflow means is formed with a double-curved surface facing inward towards the interior of the overflow means, said surface smoothly connecting with the inner surfaces of the said tube portions.

2. Apparatus according to claim 1, wherein the angle between the upstream and downstream tubes connected to the said double-curved surface of the elongated overflow means is less than 30°.

3. Apparatus according to claims 2, wherein the upstream and downstream tubes are parallel.

4. Apparatus according to claim 1, wherein the double-curved surface is saddle-shaped.

5. Apparatus according to claim 4, wherein the upstream and downstream tubes have axes that are coplanar and wherein the double-curved surface is rotary-symmetrical in the plane including the axes of the tubes and in planes parallel thereto.

6. Apparatus according to claim 5, wherein the radius of the double-curved surface in each of said parallel planes is half the respective distance between the inner surfaces of the tubes in that plane.

7. Apparatus according to claim 1, wherein the distance between said blind space and said double-curved surface of the elongated overflow means is three to six times greater than the inner diameters of the smaller of the upstream and downstream tubes.

8. Apparatus according to claim 1, wherein the distance between the inner surface of the upstream and downstream tubes is between one and two internal tube diameters.

* * * * *

UNITED STATES PATENT AND TRADEMARK OFFICE
CERTIFICATE OF CORRECTION

PATENT NO. : 4,767,243
DATED : August 30, 1988
INVENTOR(S) : Roine Brännström

It is certified that error appears in the above-identified patent and that said Letters Patent is hereby corrected as shown below:

ON THE TITLE PAGE,

Please change the name of the inventor from "Brännstroöm" to --Brännström--.

Signed and Sealed this

Thirty-first Day of January, 1989

Attest:

DONALD J. QUIGG

Attesting Officer

Commissioner of Patents and Trademarks